United States Patent
Byrne et al.

(10) Patent No.: US 6,408,226 B1
(45) Date of Patent: Jun. 18, 2002

(54) COOPERATIVE SYSTEM AND METHOD USING MOBILE ROBOTS FOR TESTING A COOPERATIVE SEARCH CONTROLLER

(75) Inventors: Raymond H. Byrne; John J. Harrington; Steven E. Eskridge, all of Albuquerque, NM (US); John E. Hurtado, College Station, TX (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 09/841,846

(22) Filed: Apr. 24, 2001

(51) Int. Cl.$^7$ ............................................. G05B 15/00
(52) U.S. Cl. .................. 700/258; 700/245; 700/259; 700/96; 700/39; 700/49; 700/250; 700/225; 700/300; 318/568.11; 318/568.12; 701/28; 701/200; 701/207; 701/213; 701/217; 701/220; 901/47
(58) Field of Search ............................... 700/245, 258, 700/259, 96, 39, 94, 250; 318/568.11, 568.12; 701/28, 1, 200, 207, 213, 23, 217, 220, 225, 300; 382/153; 348/113, 120; 901/47

(56) References Cited

U.S. PATENT DOCUMENTS

| | | | |
|---|---|---|---|
| 5,559,696 A | * 9/1996 | Borenstein | 473/588 |
| 5,576,985 A | * 11/1996 | Holtz | 264/297.2 |
| 5,596,255 A | * 1/1997 | Miyazawa | 318/568.12 |
| 6,160,371 A | * 12/2000 | Tachikawa | 318/568.11 |

FOREIGN PATENT DOCUMENTS

| | | | |
|---|---|---|---|
| JP | 11257205 A | * | 9/1999 |
| WO | WO 01/41976 A1 | * | 6/2001 |

OTHER PUBLICATIONS

U.S. application No. 09/635,019, Robinett et al., filed Aug. 4, 2000, "Distributed Optimization System and Method.".
Byrne, et al., "Cooperating Mobile Robots," pending patent application filed Apr. 24, 2001.
Feddema, et al. "Networked Mobile Robots Control Kit," pending patent application filed Apr. 24, 2001.
Feddema, et al. "Portable Control Device for Networked Mobile Robots," pending patent application filed Apr. 24, 2001.
Lewis et al. "Cooperative Control of a Squad of Mobile Vehicles," IASTED International Conference on Control and Applications, Honolulu, HI, Aug. 12–14, 1998.
Byrne et al., "Design of a Miniature Robotic Vehicle," Proceedings of the Eighteenth IASTED International Conference, Innsbruck, Austria, pp. 428–430, Feb. 1999.
Hurtado et al., "Distributed Sensing and Cooperative Control for Swarms of Robotic Vehicles," Proceedings of IASTED International Conference on Control and Applications, pp. 175–178, Honolulu, HI, Aug. 12–14, 1998.
Tadrian Batteries Ltd., "INCHARGE™ Rechargeable Lithium Battery Size 2/3 AA (R 15342)" manufacturer's data sheet describing technical details, sheet numbered 87–03–006 Rev–A.

(List continued on next page.)

Primary Examiner—William A. Cuchlinski, Jr.
Assistant Examiner—McDieunel Marc
(74) Attorney, Agent, or Firm—Suzanne L. K. Rountree

(57) ABSTRACT

A test system for testing a controller provides a way to use large numbers of miniature mobile robots to test a cooperative search controller in a test area, where each mobile robot has a sensor, a communication device, a processor, and a memory. A method of using a test system provides a way for testing a cooperative search controller using multiple robots sharing information and communicating over a communication network.

22 Claims, 5 Drawing Sheets

OTHER PUBLICATIONS

Novalog, Inc., "MiniSIR2–1™ Transceiver Module" manufacturer's data sheet describing technical details, sheet 1 of 28, Sep. 1998.
Hurtado et al., "Miniature Mobile Robots for Plume tracking and Source Localization Research," ICRA 2000 Workshops 'Mobile Micro–Robots,' San Francisco, CA, Apr. 28, 2000.
K–Team, "K–alice," product description of K–Alice and K–Alice specifications, Apr. 16, 2001, 2 pages retrieved from the Internet, at http://www.k–team.com/robots/kalice/index.html.
K–Team, "Khepera family," product description of Khepera and Khepera main features, Apr. 16, 2001, 3 pages retrieved from the Internet, at http://www.k–team.com/robots/khepera/index.html.
iRobot, "Swarm: Distributed programming of autonomous robots," Apr. 16, 2001, 2 pages retrieved from the Internet, at http://www.irobot.com/rd/research_swarm.asp.
Winfield et al., The application of wireless local area network technology to the control of mobile robots, 2000, Internet, pp. 597 607.*
Capari et al., The autonomous miniature robot alice: from prototypes to application, 2000, Internet, pp. 793–798.*
Tunstel et al., Embedded fuzzy logic–based wall–following behavior for mobile robot navigation, 1994, IEEE, pp. 329–330.*
Bhanu et al., Real–time robot learning, 2001, IEEE, pp. 491–498.*
Lund et al., From simulated to real robots, 1996, IEEE, pp. 362–365.*
Aoyama et al., Flexible micro–processing by multiple cicro robots in SEM, 2001, IEEE, pp. 3429–3434.*
Birch et al., A miniature hybrid robot propelled by legs, 2001, IEEE, pp. 845–851.*
Lim et al., A self–propelled endoscopic system, 2001, IEEE, pp. 117–1122.*
Xiao et al., Modeling and control of an under–actuated miniature crawler robot, 2001, IEEE, pp. 1546–1551.*
Grabowski et al., Localization technique for a team of small robots, 2001, IEEE, pp. 1067–1072.*
Howard et al., Fast visual mapping for mobile robot navigation, 1997, IEEE, pp. 1251–1255.*
Yesin et al, Active video system for a miniature reconnaissance robot, 2000, IEEE, pp. 3919–3924.*
Pfeiffer, Jr. et al., Case study: Developing a rule–based language for mobile robots, No date.*
Derrien et al., Approximating a single viewpoint in panoramic imaging devices, 2000, IEEE, pp. 3931–3938.*
Schreiner, Operation: microrobot, 1999, Internet, pp. 5–7.*
Nagasawa et al., Study of a small mobile robot that uses living insect antennae as pheromone sensors, 1999, IEEE, pp. 555–560.*
Beccari et al., A real–time library for the design of hygrid robot control architectures, 1998, IEEE, pp. 1145–1150.*
Chemel et al., Cyclops: Miniature robotic reconnaissance system, 1999, IEEE, pp. 2298–2302.*
Isumi et al., Fuzzy behavior–based control for a miniature mobile robot, 1998, IEEE, pp. 483–490.*
Mura et al., Visual guidance of a small mobile robot using active, biologically–inspired, eye movements, 1998, IEEE, pp. 1859–1864.*

* cited by examiner

COOPERATIVE SYSTEM AND METHOD USING MOBILE ROBOTS FOR TESTING A COOPERATIVE SEARCH CONTROLLER

RELATED PATENT APPLICATIONS

Co-pending, related applications include Robinett et al., "Distributed Optimization System and Method", patent application Ser. No. 09/635,019, filed Aug. 4, 2000; Byrne et al., "Cooperating Mobile Robots," filed on the same date as this application; Feddema et al., "Networked Mobile Robots Control Kit," filed on the same date as this application; and Feddema et al., "Portable Control Device for Networked Mobile Robots," filed on the same date as this application; all assigned to Sandia National Laboratories.

This invention was made with Government support under Contract DE-AC04-94AL85000 awarded by the U.S. Department of Energy. The Government has certain rights in the invention.

BACKGROUND OF THE INVENTION

This invention relates to the field of mobile robots and more particularly to a cooperative search controller test system using multiple mobile robots.

The use of multiple robots is particularly applicable in surveillance and inspection, in searching, in following and tagging, in locating and identifying targets, and in other applications which potentially remove humans from tedious or potentially hazardous activities. Search controllers are used to control the robots to search for an objective. Search controllers also are used to control software agents to search for an objective in computer cyberspace.

The search controllers can be most effective and efficient when large numbers of robots or agents are used. Multiple robots controlled to cooperatively achieve a search objective have the potential to be more effective than a collection of independent robots, providing the robots' searches minimize overlap and the robots do not collide. Multiple robots in a collective can collect and share information to enhance each robot's strategy to achieve the objective. Independent and distributed sensing and sharing of information among multiple autonomous or semi-autonomous cooperating robots as well as cooperative control for each robot can improve the search strategy to achieve the objective without sacrificing efficiency or imposing an undue communication or processing burden.

Mobile Robots

Different mobile robot platforms exist, spanning a wide range of costs and capabilities, from robots with electronic packages for specialized operations to inexpensive remote control cars and robots for educational applications. Remote control toys generally are operated as single units, communicating with a base control device, and do not use controllers capable of controlling and communicating among large numbers of robots.

When a distributed search system includes multiple robots such as a fleet of autonomous vehicles, reducing the size and expense of on-board compute resources improves cost effectiveness. One example of a need for cooperating robotic vehicles is in applications where autonomous robotic vehicles are used to locate a scent or a plume source (such as a bomb target, chemical source, temperature or radiation source, steam, dry ice, and humidity). Each robotic vehicle with on-board sensors needs to be inexpensive in order to utilize multiple robots in quantity in cooperating searches. An inexpensive system can have a small amount of compute power, a small amount of memory, and on-board sensors.

Lewis et al. discloses the use of a squad of all terrain RATLER™ (roving all terrain lunar explorer rovers) vehicles, like those developed at Sandia National Laboratories, for remote cooperative control and sensing in outdoor perimeter detection applications. See Lewis et al., "Cooperative Control of a Squad of Mobile Vehicles," IASTED International Conference on Control and Applications, Honolulu, Hi., Aug. 12–14, 1998. RATLER™ platforms are highly capable but could be cost prohibitive used in large quantity. Lewis et al. teaches perimeter control and squad formation relative to a lead vehicle, with teleoperation by an operator and autonomous navigation to GPS locations with a geographic information system (GIS) map. Lewis et al. does not disclose a miniature mobile robot or teach distributed mobile robots sharing information to update a cooperative search strategy in a system.

Byrne et al; "Design of a Miniature Robotic Vehicle," Proceedings of the Eighteenth IASTED International Conference, Innsbruck, Austria, pp. 428–430, February 1999, describes a robotic vehicle occupying approximately 0.5 cubic inches with a lithium battery allowing about 10 minutes of operation. The robot has limited mobility due to its small wheels and a limited lifetime due to the small battery. Byrne et al. does not disclose a robotic vehicle having a lifetime long enough to perform source searches.

Small robots are useful for research and education. Examples of small robots available commercially include those manufactured by K-Team. K-alice robot available from K-Team is capable of infrared sensing, light sensing, and motion control. K-alice specifications do not disclose a radio capable of bi-directional communications among multiple robots and a base station. Khepera robot available from K-Team is a larger robot capable of sensing, motion control, and communication. Khepera robot information discloses capabilities for trajectory planning and obstacle avoidance but does not disclose execution capabilities for a source localization controller. See K-Team product information, "K-alice" and "Khepera family," April 2001, available from the Internet.

iRobot's swarm robots utilize a multi-robot operating system and communicate with their neighbors using infrared light. iRobot swarm description discloses capabilities for group positioning into defined shapes but does not disclose execution capabilities for a source localization controller. See iRobot, "Swarm: Distributed programming of autonomous robots," April 2001, accessible over the Internet.

Due to potentially prohibitive costs of robots with their associated sensors and electronics, it is desirable to produce lower cost robots for use in quantity. Interest in the use of multiple robots in the previously mentioned application areas is growing due to recent technical and cost advances in microelectronics and sensors. These advances include small, low power CCD cameras; small microprocessors with expanded capabilities; autonomous navigation systems using global positioning systems; and several types of small sensors.

There is a need for cooperative system using inexpensive, easy to fabricate, autonomous vehicles, capable of being built in quantity, that can be used in conjunction with advances in microelectronics and sensors. These robotic vehicles need to have sufficient power to be capable of performing searches and be capable of providing communications for cooperating with other robots in source searches. Accordingly, there is an unmet need for a system using cooperating mobile robots suitable for providing independent and distributed sensing and sharing of information as well as cooperative control for each robot to improve its search strategy to achieve an objective using a distributed search system.

Cooperative System

Multiple agents or processors in a collective can collect and share information using a cooperative search controller to make better decisions in order to achieve the objective. One example of a cooperative search controller for testing with the present invention uses distributed robot sensors and cooperative control approach to effectively control multiple autonomous, robotic vehicles to locate a source within a test area.

Hurtado et al. teaches a method to control a large swarm of autonomous robotic vehicles performing a search and tag operation. See Hurtado et al., "Distributed Sensing and Cooperative Control for Swarms of Robotic Vehicles," Proceedings of IASTED International Conference on Control and Applications, Honolulu, Hi., Aug. 12–14, 1998, pp. 175–178. Hurtado et al. simulates agents with distributed sensing and information sharing for cooperative approximation of the location of a search source. Hurtado et at. does not disclose a miniature mobile robot or disclose a system of miniature mobile robots for testing a cooperative search controller.

Search controllers also need to be tested and experimentally verified. A controller intended to be used on mid- to large-scale robots can be expensive to test on those larger-scale platforms in a real-world environment. The use of smaller, less expensive robots in a smaller-scale test environment can provide experimental results using a larger number of robots to more effectively test the search controllers. A particular example environment is a search and tag operation to find the source of a time-varying chemical plume, temperature source, radiation source, or light source.

There is a need to be able to test a controller on multiple robots in a test environment where the efficacy and robustness of the controller can be evaluated without undue cost, using multiple robots that are relatively inexpensive to fabricate, capable of being built in quantity, and that can be used in conjunction with advances in microelectronics and sensors.

SUMMARY OF THE INVENTION

The present invention provides a cooperative system using mobile robots for testing a source localization controller to locate a source in a test area. The system further comprises a source generator for generating the source. The system further comprises a camera system, capable of observing the robots in the test area, and interfacing with a base station in communication with each robot.

The present invention teaches a method for testing a cooperative search controller, using a test system comprising a tracking device and multiple mobile robots cooperating to locate a source in a test area, with each robot comprising a sensor, a processor, a memory, and a communication device. Communications, processor, and memory are capable of executing source localization controller software using a reconfigurable network.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

This invention provides a cooperative system using mobile robots for testing a source localization controller to locate a source in a test area, and further comprises a source generator for generating the source. The system further comprises a camera system, capable of observing the robots in the test area, and interfacing with a base station in communication with each robot.

The present invention teaches a method for testing a cooperative search controller, using a test system comprising a tracking device and multiple mobile robots cooperating to locate a source in a test area, with each robot comprising a sensor, a processor, a memory, and a communication device.

A cooperative search system comprises both distributed sensing and cooperative control. Distributed sensing comprises data sampling through sensor readings or through function evaluations at known locations and information sharing through communication or through the use of short-term step memory. Cooperative control comprises receiving data from the other agents or processors and using the data in a cooperative approximation to the search area to generate a control or update strategy. "Cooperation" means "sharing information" in order to improve the search control strategy, or processor control strategy, to search an area for an objective.

A search area includes a two-dimensional or three-dimensional physical space. The test system can be used to test systems that will be used to search an abstract space of any dimensionality, as in a cyberspace search of a computer memory or a network cyberspace, and a search over an n-dimensional function space using a multiple-processor computer to find an optimal solution. An agent includes: search agents as well as software agents, cyberspace agents, robots, and combinations of the above.

Mobile Robot

Figure 1:
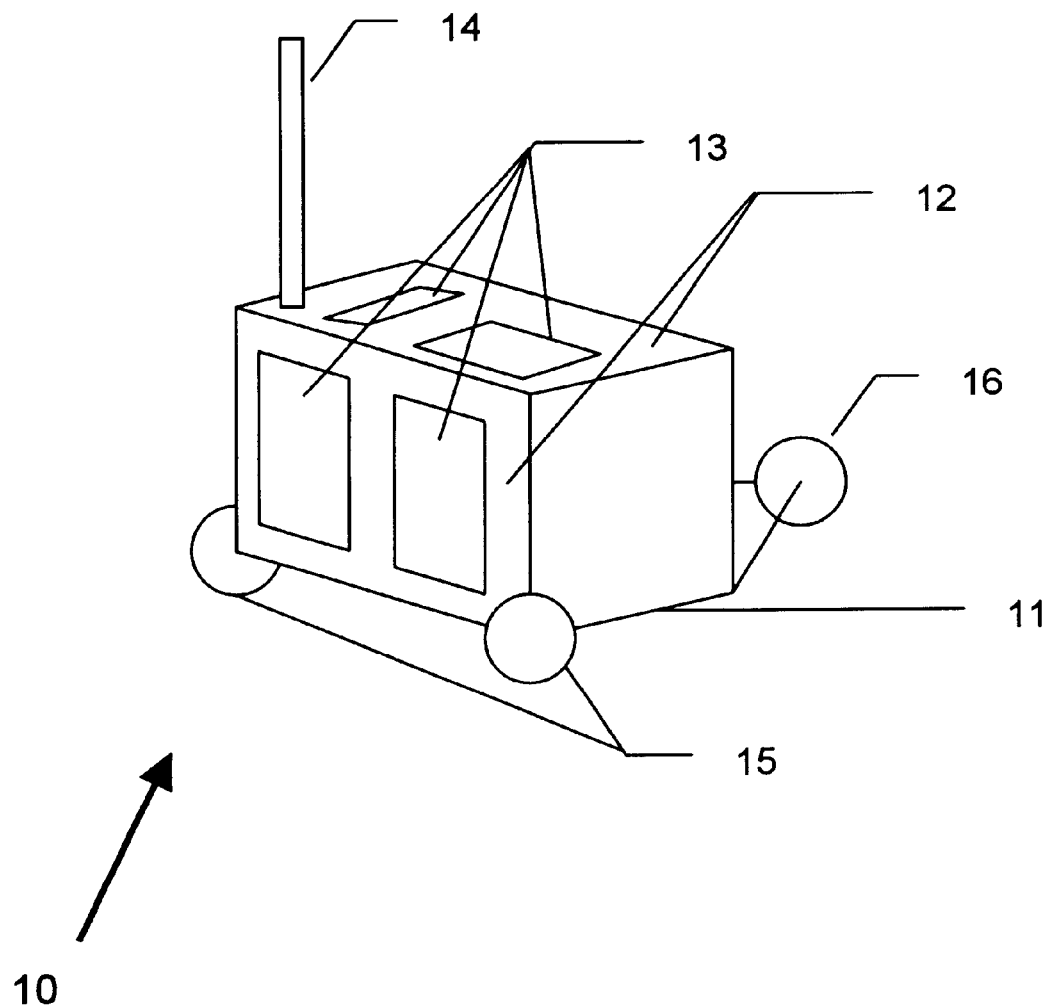
FIG. 1 is a schematic of a robotic vehicle of the present invention, showing an oblique view of the vehicle.

An example of a mobile robot according to the present invention is given in FIG. 1. FIG. 1 shows an oblique view of a schematic of mobile robot 10. Mobile robot 10 comprises body 11, comprising PC boards 12 and electronic components 13; antennae 14; drive wheels 15; and ball wheel 16.

In order to have less weight, to simplify fabrication, and to obviate the need for an external body cover, body 11 comprises a plurality of printed circuit boards 12, directly forming the robot body 11, with electronic components 13 mounted with PC boards 12. An energy source (not shown) can be housed within body 11. Antennae 14 is mounted with body 11 and used in communications. Drive wheels 15, powered by the energy source to drive mobile robot 10, are mounted with body 11. Ball wheel 16, mounted with body 11, provides a contact point for robot motion.

In one embodiment of mobile robot 10, the miniature mobile robot built has body no dimensions of 1.6"×0.75"×0.71". Printed circuit boards 12 that make up the robot electronics also are used to form body 11 of mobile robot 10. As shown in FIG. 1, printed circuit boards 12 directly form the sides of body 11 and enclose body 11 as a box-like structure. At least four of the sides of body 11 can be printed circuit boards 12. Fabrication costs are reduced because there is no machining of body panels. The interior space of body 11 houses a rechargeable lithium ion battery, as the energy source for mobile robot 10. The battery used (for example, an INCHARGE™ rechargeable lithium battery, size ⅔ AA manufactured by Tadrian Batteries Ltd.) is suitable for unrecharged operations of approximately eight hours and suitable for approximately three hours of continuous movement. A similar light-weight and long-life battery providing approximately 3.3 volts of power can be used. See Tadrian Batteries Ltd., "INCHARGE™ Rechargeable Lithium Battery Size ⅔ AA (R 15342)" manufacturer's data sheet describing technical details, sheet numbered 87-03-006Rev-A, incorporated herein by reference.

An embodiment of mobile robot 10 uses a tricycle configuration for mobility, determined by two drive wheels 15 and ball wheel 16. Each drive wheel 15 can be driven by a brushless DC motor. An embodiment with only one drive wheel driven by a motor, similar to a motorcycle, could utilize a second motor for steering or have limited turning capability with only one motor. Ball wheel 16 is a rolling component of suitably durable material for a robotic vehicle. Ball wheel 16 provides a robot contact point that rolls when mobile robot 10 is moving forward or backward and skids when mobile robot 10 is turning. Ball wheel 16 can be a rolling ball, a pivotable wheel, or similar device, and can be made of teflon, aluminum, or other durable and lightweight material.

Electronic components 13 mounted with PC boards 12 can include components for driving, sensing, communicating, and processing. A sensor can include, but is not limited to, a temperature sensor, humidity sensor, chemical sensor, light source detector, sound detector, as well as locator devices for identifying a position of the robot. Locator devices can include: inertial sensors, inertial position units, global positioning systems, initial position identifiers, dead-reckoning devices, camera systems, and combinations of the above. Communications, processor, and memory are capable of executing source localization controller software using a reconfigurable network.

Mobile Robot Communications and Processing

Figure 2:
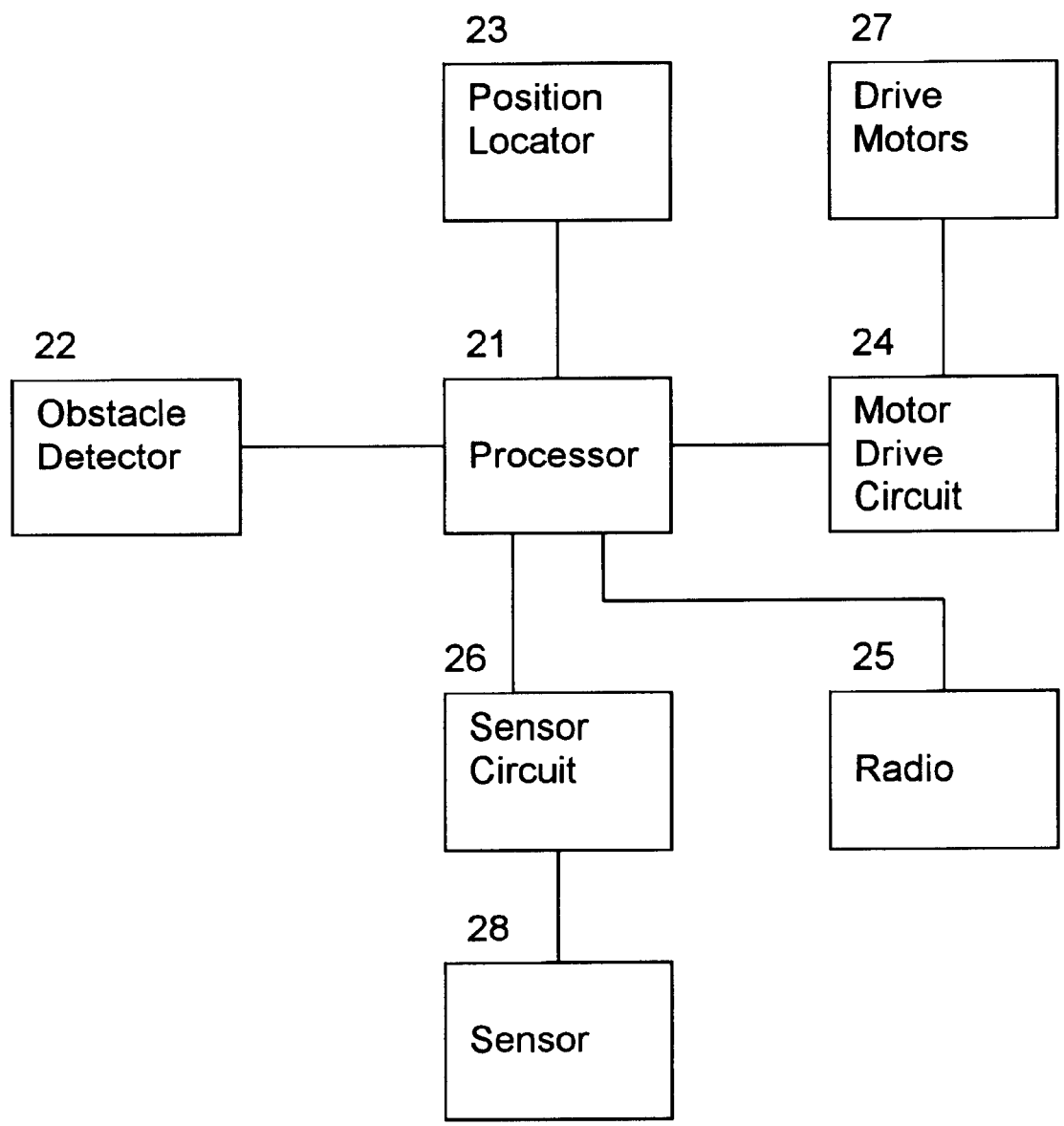
FIG. 2 is an electronics block diagram for the mobile robot according to the present invention.

FIG. 2 is an electronics block diagram for the mobile robot according to the present invention. Processor 21 interfaces to obstacle detector 22, position locator 23, motor drive circuit 24, radio 25, and sensor circuit 26. Motor drive circuit 24 controls drive motors 27. Sensor circuit 26 interfaces to sensor 28.

In one embodiment implemented, a step-up DC-DC converter (not shown) provides a regulated 3.3 volt power supply for all robot electronics interfacing with processor 21. Step-up DC-DC converter interfaces to rechargeable lithium ion battery, discussed above.

Processor 21 needs to be small and light enough for usage with mobile robot 10 in FIG. 1. One example of processor 21 is an 8-bit reduced instruction set processor (RISC)—for example, an Atmel MegaAVR 8-bit RISC processor, which has 4 Kbytes of random access memory and 128 Kbytes of FLASH memory for program storage. The Atmel processor is in-circuit programmable and can be reprogrammed to test new control software.

Obstacle detector 22 interfaces with processor 21 and is used for collision avoidance. Infrared obstacle detection sensors can be used to avoid collisions with other robots and with obstacles in the motion path. A light transmitter and receiver pair will provide a sensor range depending on obstacle reflectivity, which is approximately two inches for most surfaces. The obstacle can be detected by transmitting a bit pattern and looking for a received bit pattern that correlates—yielding binary information about the obstacle (present or absent). Obstacle detector 22 used in the implemented embodiment employs an infrared transmit LED (Light Emitting Diode) and an infrared receiving module, for example those manufactured by Novalog (model MiniSIR2-1™). See Novalog, Inc., "MiniSIR2-1™ Transceiver Module" manufacturer's data sheet describing technical details, sheet 1 of 28, September 1998, incorporated herein by reference. Similar miniature transceiver modules can be used.

Position locator 23 interfaces with processor 21 and is used to determine robot position. A GPS (Global Positioning System) unit can provide position information for a larger-scale single mobile robot with position accuracy within the granularity range of the GPS unit's capabilities. For smaller-scale mobile robots, position information can be obtained from a combination of dead-reckoning using odometry augmented with periodic position updates from a camera system. Using the combination system, a robot requests a position update from the camera system, then moves a predefined distance and requests another position update. The heading can be estimated using the distance traveled and the two position updates. Dead-reckoning can then be used with periodic position updates using the camera system to eliminate accumulated error. If communications fail between the robot and the camera system, the robot continues to rely on dead-reckoning.

Motor drive circuit 24 interfaces to processor 21 and controls drive motors 27. In the implemented embodiment, radio and motor commutation software is written in assembly language, while high-level communications, obstacle detection, and source locallization algorithms are written in the C language.

Radio 25 interfaces to processor 21 and can be used to communicate to other robots and to a base station. Communication over a radio network does require compatible radios but does not require global coordination. In the implemented embodiment, identical radios are used on the multiple robots and on the base station and are based on the TR1000 radio transceiver integrated circuit manufactured by RF Monolithics. These radios are configured for a bit rate of 125 Kbps, with an effective bit rate of 50 Kbps after the data has been encoded. All robots shared the same frequency of 916.5 MHz. The radios also are configured for ASK (Amplitude Shift Keying) modulation. The network protocols are implemented in software on the radios. The current network is based on a CSMA (Carrier Sense Multiple Access) scheme that allows any radio to talk at any given time provided the channel is not being used.

Sensor circuit 26 interfaces to processor 21 and interfaces to sensor 28. Any type of sensor can be used to detect a searchable attribute of the source. A temperature sensor was chosen for the implemented embodiment because temperature sensors are small, accurate, and inexpensive. Humidity and chemical sensors also can be used.

Cooperative Robot System for Testing a Controller

Figure 3:
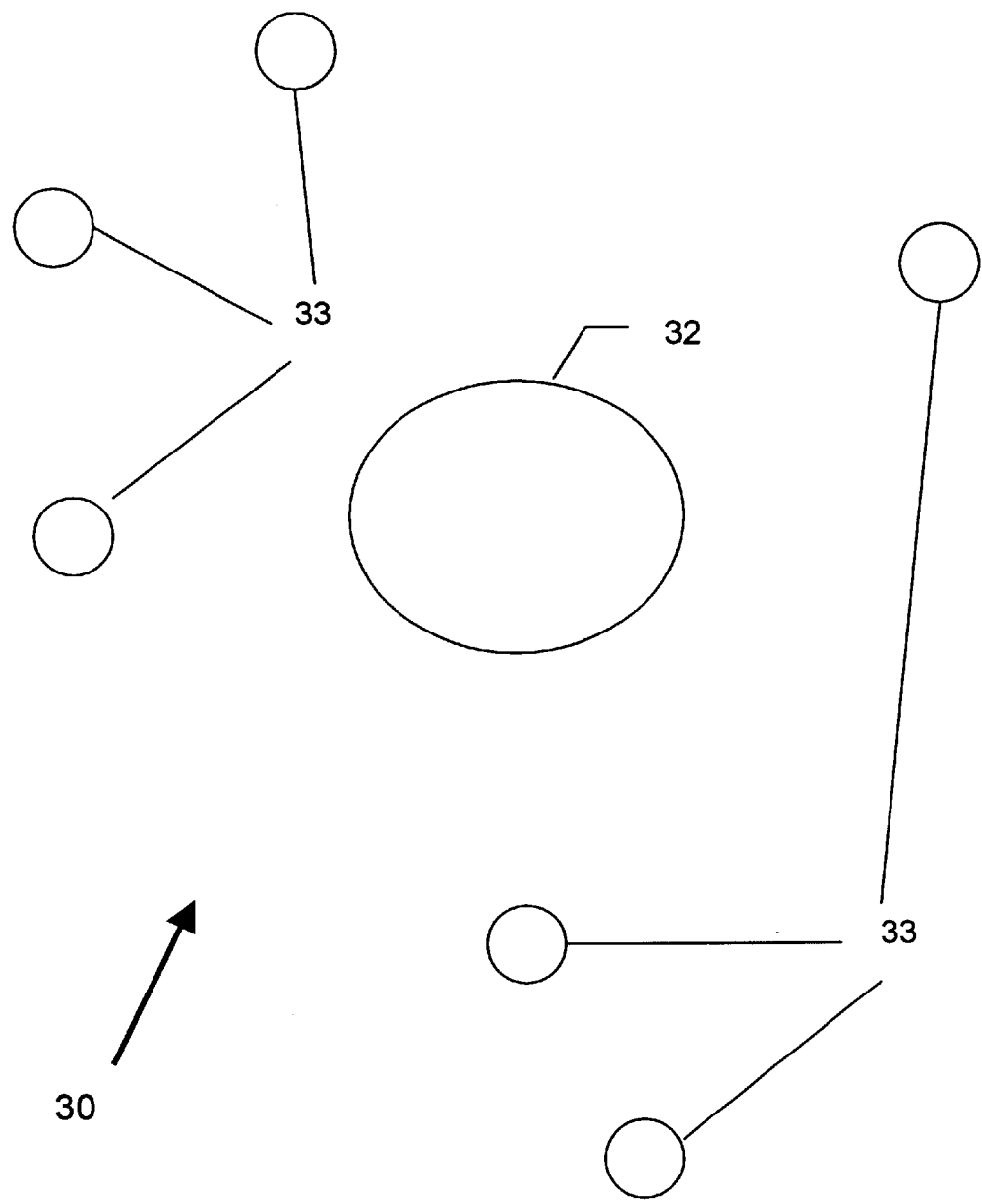
FIG. 3 is a diagram showing a cooperative robot system for testing a controller to locate a source according to the present invention.

FIG. 3 is a diagram showing a cooperative robot system for testing a controller to locate a source according to the present invention. FIG. 3 shows test system 30 comprising source 32 and cooperative robots 33. Source 32 comprises a detectable attribute that can be located by the controller.

Test system 30 provides an environment for testing search controllers for cooperating multiple robot systems and multiple agent systems. Source 32 can be steam, humidity, smoke, a thermal source, a scent source, and any other stationery or moving source (for example, a time-dependent plume to be tracked).

Cooperative robots 33 are each controlled by the controller being tested and cooperatively locate source 32 and communicate with each other using a communication device (not shown). Each cooperative robot 33 comprises a sensor (not shown) mounted with the robot and generating a sensor reading of source 32; a processor (not shown) mounted with the robot, running the controller, and interfacing to the communication device; and a memory (not shown) mounted with the robot and accessible to the processor.

Test system 30 can have a tracking device (not shown), indicating a position for each cooperating robot 33. In one embodiment of the invention, the tracking device can be a location sensor mounted with cooperating robot 33 (for example, a GPS locator).

Figure 4:
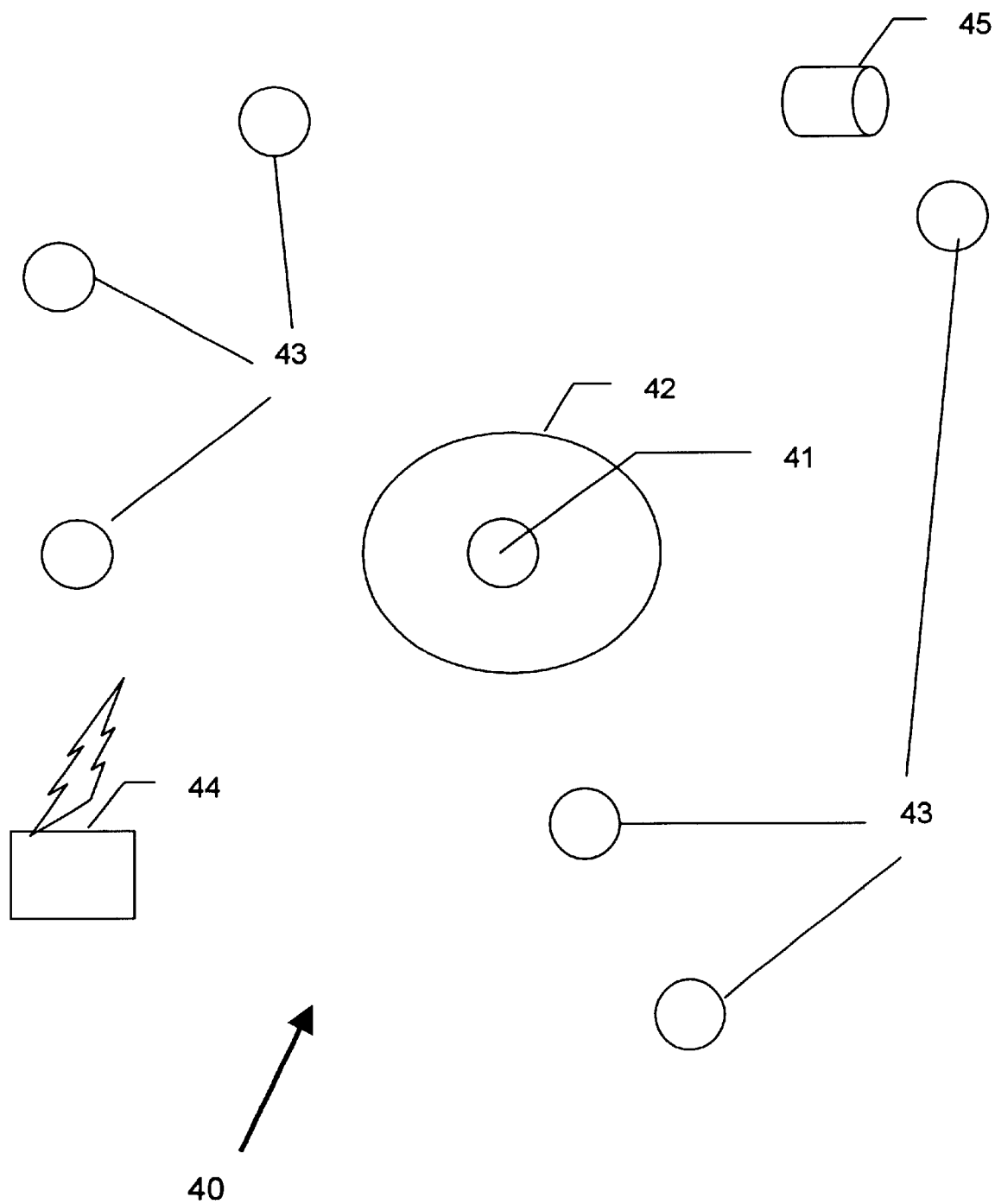
FIG. 4 is a diagram showing an embodiment of a cooperative robot system, with a base station and camera system, for testing a controller to locate a source according to the present invention.

FIG. 4 is a diagram showing an embodiment of a cooperative robot system, with a tracking device comprising a base station and a camera system, for testing a controller to locate a source according to the present invention. FIG. 4 shows test system 40 comprising source 42 and cooperative robots 43, base station 44, and camera system 45. Source 42 comprises a detectable attribute that can be located by the controller. FIG. 4 also shows source generator 41, which can be used in some embodiments to generate source 42.

Test system 40 provides an environment for testing search controllers for cooperating multiple robot systems and multiple agent systems. In test system 40, source 42 can be generated by source generator 41. As an example, a temperature source 42 is easily generated with dry ice source generator 41. Source generator 41 also can be a steam generator, a humidifier, a smoke generator, dry ice, a scent generator, and any other device capable of generating a source detectable by a sensor. Source 42, like source 32 examples given above, can be generated by source generator 41.

Cooperative robots 43 are each controlled by the controller being tested and cooperatively locate source 42 and communicate over a communication network (not shown) with base station 44. Each cooperative robot 43, similar to cooperative robot 33 discussed above, comprises a sensor, a processor, a memory, and communicates over a communication device.

Base station 44 is capable of communicating with each cooperative robot 43. In the implemented embodiment, base station 44 uses a compatible radio at the same frequency as robot radio 25 described previously. In the implemented embodiment, base station 44 uses the same processor as processor 21 described previously. One-way communications from base station 44 to cooperative robot 43 can include a robot position update and operator commands. One-way communications to base station 44 from cooperative robot 43 can include a sensor reading, diagnostic data, and test data. Cooperative robot 43 communications to another cooperative robot 43 can include position information and sensor readings. Some controllers utilize information sharing among multiple cooperative robots 43 to update the controller search strategy. Base station 44 also can receive information from camera 45.

Example Using a Cooperative Robot System

An embodiment of a cooperative robot system has been used for experimentally verifying plume tracking and source localization algorithms. Miniature robots (for example, those having dimensions on the order of 1.6"×0.75"×0.71") have been used to track a cold source. The miniature robots carried temperature sensors to measure the temperature gradient around a dry ice source. Dry ice is relatively easy to sense with an inexpensive, small sensor. In addition, dry ice creates no mess and inexpensively generates a plume for tracking.

A personal computer base station sent commands to the robots, logged test data, and interfaced to a camera system that provided position updates to the robots. The robots and the base station were connected over a radio network. To test the cooperative search controller, the robots shared sensor and position data over the radio network to cooperatively seek out the cold source. The number of robots required is dependent on the cooperative search controller. Generally, a minimum of six robots is required to run a controller test.

The base station implemented consists of an embedded personal computer, a radio, and a frame grabber card that interfaces to a ceiling-mounted camera. Software implemented on the base station, developed to run under a unix-like realtime operating system QNX, consists of an operator interface for entering commands, a display of the last robot position update, and routines that interface to the radio through a parallel printer port. The base station software logs diagnostic and test data to files for post-analysis of the test runs.

The system can be used to test large numbers of robots occupying a relatively small test area. For example, one test using the present invention used up to 18 robots in a 25 foot by 20 foot test area. The system is expected to control 50 robots in a small test area. Test have been conducted to evaluate the relationship between the number of robots and the time required to find the source.

Miniature mobile robots have been used in a hardware system to test both search algorithms and the hardware test system. Hurtado et al., "Miniature Mobile Robots for Plume tracking and Source Localization Research," ICRA 2000 Workshops 'Mobile Micro-Robots,' San Francisco, Calif., Apr. 28, 2000, incorporated herein by reference. Hurtado et al. describes a typical test with 12 cooperating robots and gives search results in a series of four graphs showing robot movement over time.

The test examples for cooperative search controllers follow the method disclosed in the next section.

Method of Using a Cooperative Robot System

In a system for testing a cooperative search controller using multiple robots operating in a test area, the objective of each robot is to search for one or more sources without a priori knowledge of the locations of the sources. Each robot can cooperate through communications with other robots and can function autonomously, in a decentralized approach with no central coordinating entity.

Figure 5:
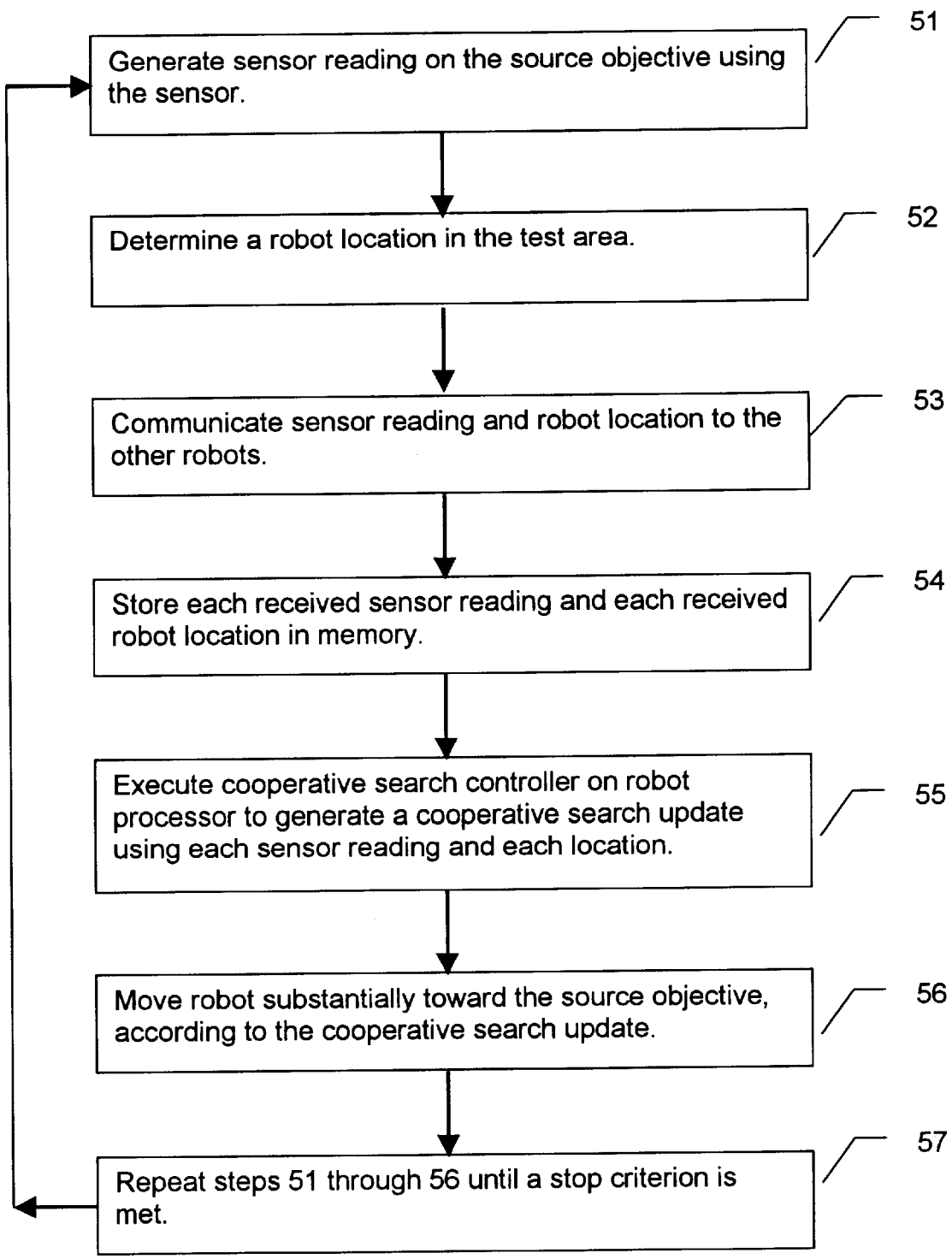
FIG. 5 is a flow diagram of the method of testing a cooperative search controller according to the present invention.

FIG. 5 is a flow diagram of the method of testing a cooperative search controller according to the present invention. The method uses multiple mobile robots cooperating to locate a source, or a search objective, in a test area. Each robot comprises a sensor, a robot processor, a memory, and a communication device. The test system has a tracking device, indicating a position for each robot. The cooperative search controller being tested is distributed and independently executed on each robot's processor. Each instance of the cooperative controller is responsive to sensor readings from multiple robots and generates a control strategy determined from a sensor reading and a multi-robot cooperative approximation to a search. The method steps for each robot are as follows:

An optional starting step in a method for a controlled test area is to generate a search source using a source generator. Examples of source generator 41 and source 42 were given previously in the discussion on FIG. 4. The search source can be any source easily generated by the source generator that can be detected and measured by the sensor on each robot. In one implemented embodiment, dry ice was used to generate a plume source for detection.

At a particular instant in time, each robotic agent samples the chemical plume field and communicates the sample information and its current location to the other agents. The agents each take the set of sample information and locations and determine a projected approximation of the location of the chemical source. The position update for each agent is based on its current location and the projected location of the source. Detailed method steps follow.

Generate a sensor reading on the source using the sensor, step 51. Each robot uses its sensor to obtain a sensor reading on the source.

Determine a robot location in the test area, step 52. One approach is to use a GPS locator to determine the robot location. For miniature robots, a GPS locator may not have fine enough granularity to pinpoint the robot location. An alternate approach is to combine a camera system with dead-reckoning to determine the robot location. In this alternate location approach, a camera system, located in a position to observe the multiple robots in the test area (for example, a ceiling-mounted camera in an enclosed test area), can be used for an instantaneous robot position update for every robot. The camera can interface with a video receiver (for example, a video interface card) mounted with a base station processor, which in turn can communicate the robot position to the robot using the communication device. Each robot can request a position update, then move a predetermined distance and request another position update from the camera system. Using the predetermined distance traveled and the two position updates, the robot can estimate its heading or orientation using software running on the robot processor. Combining the position and the orientation with dead-reckoning, the robot can then determine its search strategy. To minimize accumulated errors, the robot can request periodic position updates using the camera system and determine a new robot position. If the camera system does not respond to the robot request, the robot can continue to rely on dead-reckoning alone.

Communicate the sensor reading and the robot location to the other robots, step 53. Each robot cooperates with the other robots by sharing its sensor reading and location with the other robots to be used by the cooperative search controller. There can be several variations of the example with robots locating a source. In a global communication example variation, each agent communicates and shares information with all other agents. In a local communication example variation, each agent communicates with its nearest neighbor agents, which form a subset of the entire set of agents. A nearest neighbor agent is an agent within communication range of the agent, with which the agent communicates and shares information. The global and local communication variations do not require agents to retain memory of previous data, and only require one sensor evaluation per agent per movement. A minimum number of agents are required in order to formulate and solve for the cooperative projected approximation of the location of the source.

In a third variation of the robot and source example, each agent has step memory and makes several steps or moves, while sampling the plume field at each step and storing in memory the sample information along with the agent location for each step. Each agent then shares its multiple-step information and locations with the other agents and solves for the cooperative approximation of the location of the source.

Store each received sensor reading and each received robot location in the memory, step 54. One approach is to assign a number to each robot and to create a table in memory on each robot listing, for each robot, the robot number, the coordinates for the robot position (for example, the position in either 2D or 3D), and the sensor reading for the robot at that position.

Execute the cooperative search controller on the robot processor to generate a cooperative search update using each sensor reading and each location, step 55. Each robot independently executes the cooperative search controller on its processor and generates a new search update using the cooperatively shared position and sensor information for all other robots within its communication range.

Move the robot substantially toward the objective, according to the cooperative search update, step 56. The search update generated in step 55 tells the robot where to move.

Repeat steps 51 through 56 until a stop criterion is met, step 57. Each robot continues to collect and share information, generate search updates, and move toward the search source or objective until a stop criterion is met. For example, one stop criterion is to continue searching until all robots are within a predetermined distance of the source. Another stop criterion is to continue searching until a predetermined majority of the robots are within a predetermined distance of the source. Another stop criterion is to continue searching as long as any robot continues to generate search updates.

To add control by an operator (for example, to generate commands, to determine the point at which to stop the search, or to modify information), the system can have an operator command device as part of the base station. Additional method steps can include: accept an operator input from the operator input device, generate a robot command on the base station processor from the operator input, and transmit the robot command to the robot over the communication device on a communication network.

To add information display (for example, to add an overall display of robot positions), the system can have a display device as part of the base station. Additional method steps can include: receive the robot position over the communication network, and display a robot position for each robot on the display device.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A cooperative system using mobile robots for testing a source localization controller to locate a source in a test area, comprising:
 a) a source, having a detectable attribute;
 b) a plurality of mobile robots, cooperatively locating the source, each mobile robot controlled by the source localization controller, each mobile robot comprising:
  i) a sensor, mounted with the mobile robot, generating a sensor reading of the source;
  ii) a robot communication device, mounted with the mobile robot;
  iii) a robot processor, mounted with the mobile robot, interfacing to the robot communication device, and running the source localization controller; and
  iv) a memory, mounted with the mobile robot, accessible to the robot processor; and c) a communication network, in communication with each robot communication device, and interfacing the plurality of mobile robots.

2. The cooperative system of claim 1, further comprising a source generator, wherein the source is generated by the source generator.

3. The cooperative system of claim 2, wherein the source generator is a thermal source.

4. The cooperative system of claim 3, wherein the thermal source is a cold source comprising dry ice.

5. The cooperative system of claim 1, wherein each mobile robot comprises a miniature mobile robot.

6. The cooperative system of claim 1, wherein the source comprises a mobile source.

7. The cooperative system of claim 1, wherein the communication network comprises a reconfigurable network.

8. The cooperative system of claim 1, further comprising:
a) a base station, collecting test information on the source localization controller;
b) wherein the base station comprises a base station communication device;
c) wherein each mobile robot communicates with the base station communication device over the communication network.

9. The cooperative system of claim 8, further comprising:
a) a camera system, locatable to observe the plurality of mobile robots in the test area, and generating a position update for each mobile robot;
b) wherein each robot processor is capable of determining a robot position using the position update.

10. The cooperative system of claim 9, wherein the base station further comprises:
a) a base station processor; and
b) a video interface card, mounted with the base station processor, capable of interfacing to the camera system.

11. The cooperative system of claim 10, wherein the video interface card comprises a frame grabber card.

12. The cooperative system of claim 10, wherein the base station further comprises:
a) an operator command device, in communication with the base station processor, and accepting an operator input; and
b) a display device, adapted to display the robot position for each mobile robot.

13. The robotic system of claim 10, wherein the base station further comprises:
a) a memory, in communication with the base station processor; and
b) a data logger, capable of storing data in the memory.

14. A test system for testing a cooperative search controller using a mobile robot team to search an area for an objective, comprising:
a) a plurality of cooperating robots, operating within the area, each cooperating robot comprising:
  i) a sensor, mounted with the mobile robot, generating a robot sensor reading on the objective;
  ii) a communication device, mounted with the mobile robot, communicating the robot sensor reading to the other cooperating robots;
  iii) a memory, mounted with the mobile robot, capable of storing a received sensor reading communicated from the other cooperating robots; and
  iv) a processor, mounted with the mobile robot, in communication with the sensor and the memory;
  v) wherein the processor executes the cooperative search controller, using the received sensor reading and the robot sensor reading to generate a cooperative search update; and
b) a tracking device, indicating a position for each mobile robot.

15. The test system of claim 14, wherein for each cooperating robot, the tracking device comprises a location sensor, mounted with the cooperating robot.

16. The test system of claim 14, further comprising a base station,
a) wherein the tracking device comprises:
  i) a camera system, in communication with the base station, generating a position update for each of the cooperating robots;
b) wherein the base station comprises:
  i) a video receiver, accepting input from the camera system; and
  ii) a base station communication device, capable of communicating the position update to each cooperating robot.

17. The test system of claim 14, wherein each cooperating robot further comprises a collision avoidance device, mounted with the cooperating robot.

18. A method of using a test system for testing a cooperative search controller, the test system comprising a plurality of mobile robots cooperating to locate a source in a test area, each mobile robot comprising a sensor, a robot processor, a memory, and a communication device; the test system comprising a tracking device and a communication network; each communication device interfacing with the communication network, the method comprising:
a) for each mobile robot, generating a robot sensor reading on the source using the sensor;
b) for each mobile robot, determining a robot location in the test area using the tracking device;
c) for each mobile robot, communicating the robot sensor reading and the robot location to the other mobile robots using the communication device;
d) for each mobile robot, storing a received sensor reading and a received robot location in the memory;
e) for each mobile robot, executing the cooperative search controller on the robot processor to generate a cooperative search update using the received sensor reading, the received robot location, the robot sensor reading, and the robot location;
f) for each robot, moving the mobile robot substantially toward the objective, according to the cooperative search update; and
g) for each robot, repeating steps a) through f) until a stop criterion is met.

19. The method of claim 18, wherein the test system further comprises a base station comprising a base station video receiver and a base station processor, wherein, for each mobile robot, the step of determining the robot location in the test area, comprises:
a) determining a position update for the mobile robot using the tracking device;
b) communicating the position update from the tracking device to the base station video receiver;
c) communicating the position update from the base station to the mobile robot, using the communication network; and
d) generating the robot location from the position update using the robot processor.

20. The method of claim 19, wherein the test system further comprises a source generator, wherein the method further comprises generating the source using the source generator.

21. The method of claim 19, wherein the test system further comprises an operator command device, wherein the method further comprises:
   a) accepting an operator input from the operator command device;
   b) generating a robot command on the base station processor from the operator input; and
   c) transmitting the robot command to each robot over the communication network.

22. The method of claim 19, wherein the test system further comprises a display device, wherein the method further comprises:
   a) receiving the robot position from each robot over the communication network; and
   b) displaying a robot position for each mobile robot on the display device.

* * * * *